United States Patent [19]

Yamamoto et al.

[11] Patent Number: 4,916,604
[45] Date of Patent: Apr. 10, 1990

[54] CACHE STORAGE APPARATUS

[75] Inventors: Akio Yamamoto; Kanji Kubo, both of Hadano, Japan

[73] Assignee: Hitachi, Ltd., Tokyo, Japan

[21] Appl. No.: 211,451

[22] Filed: Jun. 24, 1988

[30] Foreign Application Priority Data

Jun. 26, 1987 [JP] Japan .................. 62-159350

[51] Int. Cl.⁴ ............................................. G06F 12/08
[52] U.S. Cl. ............................... 364/200; 364/243.41; 364/242.6; 364/244.3
[58] Field of Search .................. 364/200 MS, 900 MS

[56] References Cited

U.S. PATENT DOCUMENTS

| 4,208,716 | 6/1980 | Porter et al. | 364/200 |
| 4,314,331 | 2/1982 | Porter et al. | 364/200 |
| 4,517,640 | 5/1985 | Hattori et al. | 364/200 |
| 4,523,206 | 6/1985 | Sasscer | 364/200 |
| 4,525,777 | 6/1985 | Webster et al. | 364/200 |

FOREIGN PATENT DOCUMENTS 54-66727  3/1979  Japan .
61-80447  4/1986  Japan .

Primary Examiner—Thomas M. Heckler
Attorney, Agent, or Firm—Fay, Sharpe, Beall, Fagan, Minnich & McKee

[57] ABSTRACT

A cache storage apparatus used for a plurality of requestors includes a unit for detecting if consecutive requests by the same requestor have the same access line; a stack unit for storing access addresses to a cache storage unit for each requestor after a cache directory unit was searched; and a plurality of pipe lines allowing the service of plural and concurrent accesses to other than the cache directory unit. In the cache storage apparatus, if there are consecutive accesses to the same line from the same requestor, the access address to the cache storage unit for the succeeding request is not obtained by searching the cache directory unit, but the access address to the cache storage unit for the preceding request is read from the stack unit and used as the access address for the succeeding request. If there is an access request from another requestor while processing the succeeding request which does not require the search of the cache directory unit, the priviledge of using the cache directory unit is given to the access request by the other requestor to thereby allow concurrently processing a plurality of requests.

4 Claims, 4 Drawing Sheets

CACHE STORAGE APPARATUS

BACKGROUND OF THE INVENTION

The present invention relates to a cache storage apparatus of information processing apparatus. More particularly, the invention concerns a cache storage apparatus wherein the frequency of access by one of a plurality of access requestors to the cache directory unit can be reduced so that possibility of access by another requestor to the cache directory unit can be made high to thereby improve the utilization coefficient of the apparatus.

A cache storage apparatus is constructed of a cache storage unit for storing data of a main storage in units of several areas (hereinafter called line unit), and a cache directory unit for storing main storage addresses (line addresses) of the data stored in the cache storage unit. When a memory request is issued from a requestor, the cache directory unit is searched. The cache storage unit is then accessed in accordance with the search result.

There is known a method of improving the utilization coefficient of a cache storage apparatus of this type, as disclosed for example in Japanese Patent Laid-open Publication NO. JP-A-61-80447. According to this method, for example, two consecutive 8 byte store instructions at the same line address are merged into one 16 byte store instruction within a stack of the cache storage apparatus when the addresses thereof are succeeding. Therefore, the cache directory unit is searched only once instead of two times in order to access the cache storage unit, and the frequency of access to the cache directory unit can be reduced to allow the resultant vacant time to be used for processing another request. With this method, however, the reduction of frequency of access to the directory unit can be made only when store instructions from one requestor are consecutively sent and the addresses of the two succeeding store instructions are succeeding, and cannot be expected in other cases. Therefore, the advantage of such reduction is substantially limited.

Another method of improving the utilization coefficient of a cache storage apparatus is disclosed, e.g., in Japanese Patent Laid-open Publication No. JP-A-54-66727 wherein the directory unit is divided into a plurality of banks to allow concurrent processing of access requests from a plurality of requestors. Although this method has many advantageous points from the view point of utilization coefficient of a cache storage apparatus, the quantity of hardwares for controlling and addressing a plurality of banks is expected to increase, resulting in expensive cost.

SUMMARY OF THE INVENTION

An object of the present invention is to provide a cache storage apparatus wherein the increase in hardware quantity is suppressed, useless search of a cache directory unit is avoided, and the resultant access vacant time of the cache directory unit is used for processing a request from another requestor to thus improve the utilization coefficient of the apparatus.

The above object can be achieved by a cache storage apparatus according to the present invention. The cache storage apparatus used for a plurality of requestors comprises means for detecting if consecutive requests by the same requestor have the same access line; stack means for storing access addresses to a cache storage unit for each requestor after a cache directory unit was searched; and a plurality of pipe lines allowing the service of plural and concurrent accesses to other than the cache directory unit. In the cache storage apparatus, if there are consecutive accesses to the same line from the same requestor, the access address to the cache storage unit for the succeeding request is not obtained by searching the cache directory unit, but the access address to the cache storage unit for the preceding request is read from stack means and used as the access address for the succeeding request. If there is an access request from another requestor while processing the succeeding request which does not require the search of the cache directory unit, the priviledge of using the cache directory unit is given to the access request by the other requestor to thereby allow concurrently processing a plurality of requests.

In case where there are consecutive requests from the same requestor, means for detecting if the succeeding request has the same access line as of the preceding request is used for judging if the access address to the cache storage unit is to be obtained by the search of the cache directory unit or if the search result of the cache directory unit by the preceding request is to be used. Stack means for storing access addresses to the cache storage unit for each requestor after the cache directory unit was searched, temporarily stores the addresses, and if the succeeding request has the same line as of the preceding request, then the address for the preceding request is read from stack means and used as the address for the succeeding request. If the succedding request of the same requestor has the same line and does not use the directory unit, the plurality of pipe lines allowing accesses to other than the cache directory unit are used for concurrently processing the requests from other requestors which require the search of the directory unit.

The cache storage apparatus connected to a plurality of requestors is usually mounted within a storage controller (hereinafter simply called SC). Requestors include at least one instruction processor (hereinafter simply called IP) and at least one input/output processor (hereinafter simply called IOP). In many cases, IP has its own cache storage apparatus. If a store through system is employed by the cache storage apparatus within IP, most of accesses to the cache storage apparatus within SC are store instructions. As the line size becomes large in the order of 256 bytes to 512 bytes, it is expected that not only consecutive 8 byte store instructions but also store instructions with dispersed addresses, respectively from the same IP, have the same line with an increased probability. Therefore, the advantage of this invention becomes considerably great. As to requests from IOP, most of data transfer and the like are expected to be read/write operations, thus leading to considerable advantage.

DESCRIPTION OF THE PREFERRED EMBODIMENTS

The embodiments of a cache storage apparatus according to the present invention will be described below with reference to the accompanying drawings.

Figure 1:
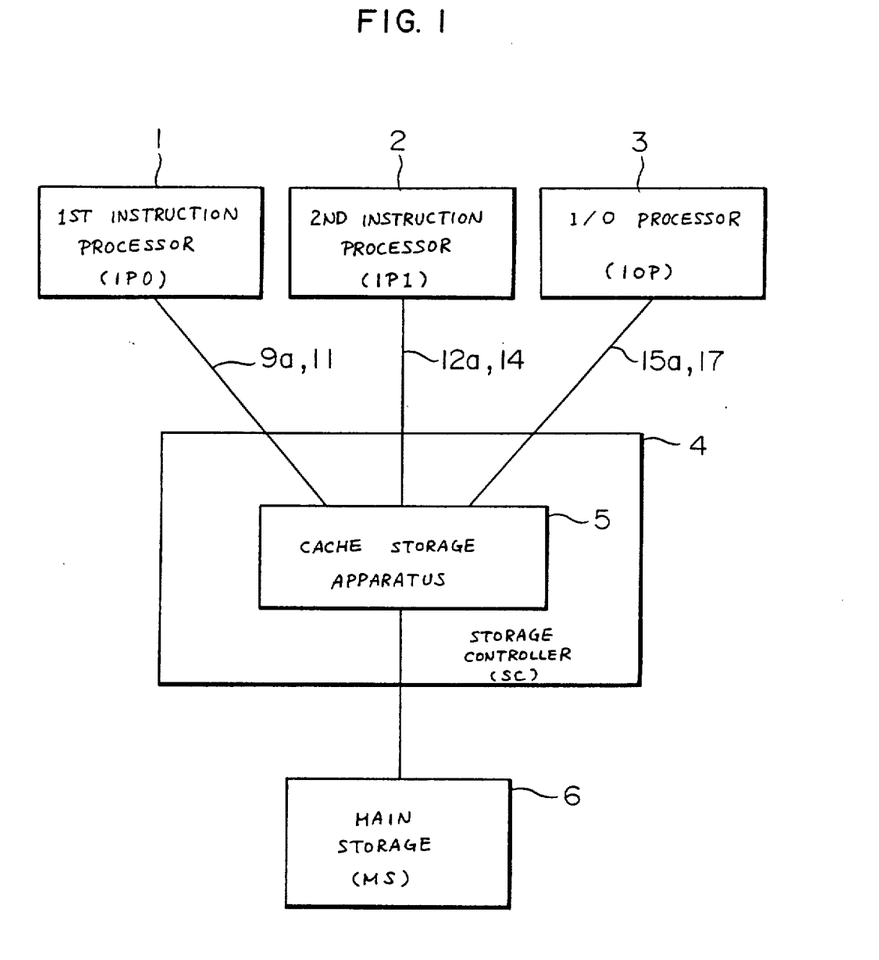
FIG. 1 is a block diagram showing an example of a system to which this invention is applied.

FIG. 1 shows an example of a system to which the present invention is applied. The system is constructed of a first instruction processor (IP0) 1, a second instruction processor (IP1) 2, an input/output processor (IOP) 3, a storage controller (SC) 4, a cache storage apparatus 5 within SC 4, and a main storage (MS) 6.

The system shown in FIG. 1 is constructed of two instruction processors and one input/output processor by way of example.

Figure 2:
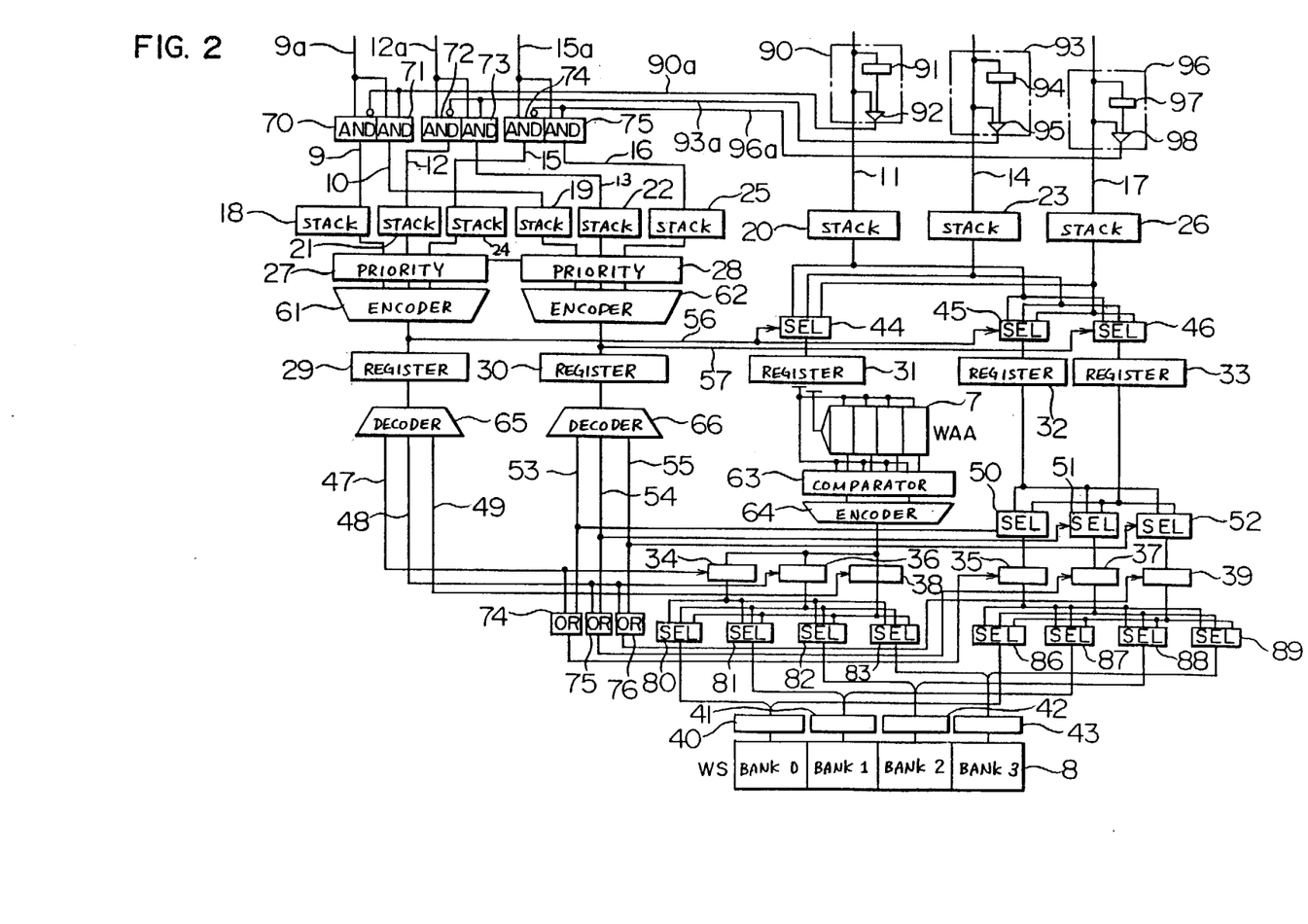
FIG. 2 is a schematic circuit diagram showing an embodiment of a cache storage apparatus according to the present invention.

FIG. 2 shows the detailed arrangement of the cache storage appparatus 5. In this embodiment, the cache storage apparatus has a cache directory unit (hereinafter simply called WAA) 7 having 4 rows for example, and a cache storage unit (hereinafter simply called WS) 8 having 4 banks for example. A request for the cache storage apparatus 5 by the first instruction processor IP0 is received by an IP0 request signal line 9, an IP0 same line request signal line 10 and an IP0 request address line. Similarly, a request by the second instruction processor IP1 is received by an IP1 request signal line 12, an IP2 same line request signal line 13 and an IP1 request address signal line 14. A request by the input/output processor IOP is received by an IOP request signal line 15, an IOP same line request signal line 16 and an IOP request address line 17.

As described previously, in case where there are consecutive access requests to the cache storage unit 8 from the same requestor, the term "same line request" herein used means the succeeding request which has the same access line as of the preceding request.

Referring to FIG. 2, circuits 91, 94 and 97 connected to the address lines 11, 14 and 17 are used for detecting the same line request, the circuits having registers 91, 94 and 97 for temporarily storing request addresses from IP0, IP1 and IOP, and comparators 92, 95 and 98. For example, in the circuit 90, the addresses of a preceding request from IP0 are temporarily stored in the register 91 via the signal line 11. The addresses of the succeeding request are compared with the addresses of the preceding request read from the register 91, by the comparator 92. If the address line is the same, a same line request signal is outputted onto a signal line 90a. The other circuits 93 and 96 operate in the similar manner to output same line request signals onto signal lines 93a and 96a upon detection of same line requests. The circuits 90, 93 and 96 may be provided on the side of IP0, IP1 and IOP, instead of providing them on the side of the cache storage apparatus.

A same line request signal on the signal line 90a is supplied to an AND gate 71 and at the same time to an inverted input of an AND gate 70. A request signal line 9a from IP0 is connected to the AND gates 70 and 71. As a result, an ordinary request signal is outputted onto the signal line 9 in case of an ordinary request (request with WAA search), whereas a same line request signal is outputted on the signal line 10 in case of a same line request (request without WAA search).

Same line request signals on other signal lines 93a and 96b are processed at AND gates 72 to 75 in the similar manner so that the description therefor is omitted.

Ordinary requests (request with WAA search) from IP0, IP1 and IOP are temporarily stored in stacks 18, 21, 24, respectively, whereas same line requests (request without WAA search) are temporarily stored in stacks 19, 22 and 25, respectively. Request addresses from IP0, IP1 and IOP are temporarily stored in stacks 20, 23 and 26.

Requests stored in the stacks are supplied to priority circuits 27 and 28 respectively for ordinary requests and same line requests and selectively picked up for each requestor. Information (sink information) on the requestor is stored in registers 29 and 30 respectively for ordinary requests and same line requests. Of ordinary request addresses corresponding to the request stored in the register 29, the WAA search address is stored in a register 31 via a selector 44 and the address other than the WAA search address necessary for the access to WS is stored in a register 32 via a selector 45. Only the same line request address corresponding to the request stored in the register 30 is stored in a register 33 via a selector, because the WAA search is not necessary.

Row information (row addresses) after the WAA search is stored in registers 34, 36 and 38 for respective IP0, IP1 and IOP requestors via an encoder 64. Addresses necessary for the WS access other than the address for the WAA search are stored in registers 35, 37 and 39 for respective IP0, IP1 and IOP registers 40 to 43 for the WS access addresses are provided for each bank.

The ordinary request processing, same line request processing, and concurrent processing of the ordinary request and the same line request will be described in detail. It is assumed that the operation is for cache-in.

(1) First, the ordinary request processing (processing of a request which requires a WAA search) will first be described.

Consider that an ordinary request is issued from a requestor, e.g., IP0. An ordinary request is stored in the IP0 ordinary request stack 18 via the IP0 request signal line 9. In case of an ordinary request, the IP0 same line request signal line 10 is maintained off. The corresponding addresses are stored in the IP0 request address stack 20 via the IP0 request address line 11. The request is selected in accordance with the priority order by the priority circuit 27 and thereafter, it is encoded by an encoder 61 to generate a select signal corresponding to the requestor IP0. The select signal is supplied to selectors 44 and 45 via a signal line 56. Of the request addresses stored in the IP0 request address stack 20, the WAA search address is set in a WAA search address register 31 by the selector 44, whereas the address other than the WAA search address is set in an ordinary request WS access address register 32 by the selector 45. At this time, a selector 46 is maintained off so that no address is set in a register 33.

WAA 7 is searched in accordance with the address stored in the register 31. The search result is compared by a comparator 63. If the coincidence of the address is detected, the row address is generated by an encoder 64. At this time, of output lines of a decoder 65 including an IP0 set signal line 47, an IP1 set signal line 48 and an IOP set signal line 49, only the IP0 set signal line 47 is maintained on due to the presence of an output from the register 29. Therefore, the row address generated by the encoder 64 is set only in an IP0 address register 34 connected to the signal line 47. In this case, since the request is from IP0, the IP1 set signal line 48 and the IOP set signal line 49 are maintained off so that a row address is not set in an IP1 row address register 36 and nor in an IOP row address register 38. In parallel with setting the row address, the address in the register 32 is selected by the selector 50 and set in an IP0 ws access address register 35 connected via an OR gate 74 to the signal line 47 which is on. The selector 50 selects an output from the register 32 if a signal line 53 connected thereto is off and selects an output from the register 33 if the signal line 53 is on. Similarly, a selector 51 selects an output from the register 32 if a signal line 54 connected thereto is off and selects an output from the register 33 if the signal line 54 is on. Since the request is an ordinary request from IP0, a select signal is not outputted from an encoder 62. As a result, the signal line 53 is maintained off so that the selector 50 selects an output from the register 32. If the request is for the bank 0 of WS 8, WS request addresses from the registers 34 and 35 are thereafter stored at a predetermined timing in a WS bank 0 access address register 40 via selectors 80 and 86 to access the bank 0 of WS 8.

(2) Next, the same line request processing (processing of a request which does not require a WAA search) will be described.

Consider the case where the same line request is issued from IP0 after the operation described in (1). The circuits for detecting the same line request may be provided on the side of requestors instead of providing the circuits on the side of the cache storage apparatus as shown in FIG. 2. In case of the same line request, simultaneously with sending a request onto the IP0 request signal line 9, the same line request is outputted onto the IP0 same line request signal line 10. Namely, the request signal line 9 and the same line request signal line 10 become on at the same time in the case of the same line request. In this condition, the same line request is stored in the IP0 same line request stack 19, whereas the request signal on the signal line 9 is not stored in the stack 18 because of the presence of the AND gate 70. The corresponding request addresses are stored in the address stack 20 via the IP0 request address line 11 upon issuance of the request. After the IP0 same line request is selected by the priority circuit 28, it is encoded by the encoder 62 to generate a select signal corresponding to IP0. The select signal is supplied to a selector 46 which picks up the request addresses in the IP0 request stack 20 to be stored in a register 33. Since the signal line 56 is not activated and there is no select signal to the selector 44, no address is set in the register 31.

In the meantime, the IP0 set signal line 53 is maintained on by the decoder 66 which receives the select signal from the register 30. Therefore, the address in the register 33 is selected by the selector 50 connected to the signal line 53, and stored in the IP0 WS access address register 35. At this time, a select signal corresponding to IP0 is not stored in the register 29 so that the set signal line 47 is maintained off. Accordingly, an output from the encoder 64 is not stored in the IP0 row address register 34, but the WAA search result for the preceding IP0 ordinary request is being held. Therefore, WS access addresses in the registers 34 and 35 are stored in any one of the access bank registers 40, 41 and 42 to access WS 8.

As appreciated from the above operation, the WAA search result at the preceding ordinary request by the same requestor is read from one of the row address registers 34, 36 and 38 to use it as the row address of the same line request. Therefore, it is not necessary to search WAA 7.

(3) The concurrent processing of an ordinary request and a same line request will then be described.

Consider the case where the same line request is issued from IP0 for example and the ordinary request is issued from IP1. The same line request from IP0 is stored in the request stack 19 in the similar manner as described in (2), and is selected by the priority circuit 28. The encoder 62 then generates a select signal corrsponding to IP0 and outputs it onto the signal line 57 so that the request addresses in the stack 20 from IP0 are selected by the selector 46 to be stored in the register 33. In synchro with this, the ordinary request in the stack 21 from IP1 is selected by the priority circuit 27 in the similar manner as described in (1). The encoder 56 then generates a select signal corresponding to IP1 so that of the request addresses from IP1, the WAA search address in the stack 23 is selected by the selector 44 and stored in the register 31, and the address other than the WAA search address in the stack 23 is selected by the selector 45 and stored in the register 32.

In the meantime, since the signal line 53 is maintained on by the decoder 66, the access addresses of the same line request from IP0 in the register 23 are selected by the selector 50 and set in the IP0 WS access register 35. Since the request from IP0 is not an ordinary request, the signal line 47 is maintained off so that the row address at the preceding ordinary request is being held in the row address register 34.

In parallel with the flow of the request addresses from IP0, the signal line 48 is made on by the decoder 66 and the signal line 54 is made off by the decoder 66, respectively in accordance with the ordinary request from IP1. As a result, the row address can be obtained by searching WAA and it is set in the IP1 row address register 36, while the other WS access address in the register 32 is selected by the selector 51 and set in the register 37.

As appreciated by the above operation, the requests from two requestors are processed in parallel such that of the WS access addresses, the addresses for the IP0 request are stored in the registers 34 and 35, while the addresses for the IP1 are stored in the registers 36 and 37. As a result, if both the requests use different access banks to WS 8, both the accesses are processed concurrently through the control of WS banks. If both the requests use the same access bank to WS 8, a priority order is decided through the control of WS banks and an access by the request having a higher priority is first processed.

In case where the ordinary request and the same line request are issued at the same time from different requestors, the priority circuits 27 and 28 decide a priority order and a select signal for the request having a higher priority is first outputted.

Next, the access processing with a so-called cache miss will be described wherein the line address corresponding to the ordinary request from a requestor is not present in the cache directory unit. In this case, a cache miss processing is performed wherein the corresponding line addresses are overwritten in WAA 7 through line transfer operation by MS 6, and the access data corresponding to the line addresses are overwritten in WS 8. Consequently, after the cache miss processing has been completed, in the ordinary request, there may arise a case where an old WS access address stored prior to occurrence of the cache miss and prior to the overwriting is being stored in the register 34.

In such a case, if the same line request is issued from IP0 in the first embodiment apparatus, WS 8 is accessed by the old WS access address in the register 34 and data cannot be read correctly therefrom. In view of this, it becomes necessary that the same line request after occurrence of a cache miss is considered as the ordinary request, and that WAA 7 is searched in accordance with an access request from a requestor to read a new line address and store it in the corresponding register.

A second embodiment of this invention, which embodiment is a modification of the first embodiment to perform such processes, will be described with reference to FIG. 3.

In this embodiment, instead of the stacks 18 to 25 shown in FIG. 2, cache response circuits 100, 102 and 104 are provided for respective requestors. Only the structure of the cache response circuit 100 for IP0 is shown in FIG. 3, the structure of the circuits 102 and 104 for IP1 and IOP being the same as that of the circuit 100 and omitted in FIG. 3.

The description is therefore limited only to the cache response circuit 100. If a cache miss occurs while searching WAA 7, the comparator 64 supplies a reset signal "0" representative of a valid bit to all the cache response circuits 100, 102 and 104 for IP0, IP1 and IOP via a signal line 112. A reset signal on the signal line 112 is supplied to a valid bit latch 107. Stacks 105 and 106 temporarily store the ordinary request and the same line request from the signal lines 9 and 10, respectively. An output from the latch 107 is supplied to an AND gate 108, and the inverted output thereof is supplied to an AND gate 109, both the AND gates being supplied with an output from the stack 106. An output from the AND gate 108 is supplied to the priority circuit 28, while an output from the AND gate 109 as well as an output from the stack 105 is supplied to the priority circuit 27 via an OR gate 110.

On the contrary, if an access address is found in WAA 7 while searching it, the comparator 63 outputs a set signal "1" only to the latch of a requestor (e.g., latch 107 of requestor IP0) to make the cache miss response circuit in a set state. Accordingly, if the same line request is issued from IP0 while a set signal is being set in the latch 107, the same line request is supplied to the priority circuit 28 via the AND gate 108 to perform the same line request processing.

If on the other hand the same line request is issued while a reset signal is being set in the latch 107, the ordinary request is supplied to the priority circuit 27 via the AND gate 109 and the OR gate 110. As above, if a cache miss occurs, the same line request is changed to the ordinary request to perform correct WS access.

If the ordinary request is issued on the signal line 9, the ordinary request is supplied to the priority circuit via the stack 105 and the OR gate 110.

If a cache miss occurs at the ordinary request during parallel operation of the ordinary request and the same line request, the process advances to line transfer operation by MS 6 after the end of the same line request processing.

In the above embodiments, the concurrent access processing for the requests by two requestors has been described. The schematic circuit diagram of an example of the apparatus which can process the requests by all the requestors (in this case, three requestors) at the same time is shown in FIG. 4, wherein elements with the same reference numerals as those in FIGS. 2 and 3 have the same function as that described with FIGS. 2 and 3. The embodiment shown in FIG. 4 is a modification of the first embodiment shown in FIG. 1, and omits the circuits for detecting the same line request shown in FIG. 2 and the cache miss response circuits.

This embodiment is constructed such that concurrent processing of the ordinary request from a requestor and the same line requests from two requestors, and of the same line requests from three requestors can be performed. In particular, of request addresses from respective requestors IP0, IP1 and IOP, three registers 33a to 33c and three selectors 46a to 46c are provided for storing addresses other than WAA search addresses, the selectors 46a to 46c being connected to signal lines 57a to 57c of a priority circuit 28a. In this embodiment, instead of the priority circuit 28 shown in FIG. 2, the priority circuit 28a whose function is different from that of the circuit 28 is used. The output lines from the circuit 28a are connected directory to the selectors 50 to 52 and the like without using the register 30 and the decoder 66. If the same line requests are issued by two or more requestors at the same time, the comparator 28a judges if the requests use different access banks to WS 8 or not. If different access banks are used, select signals corresponding to respective requestors are outputted onto the signal lines 57a to 57c. If the same access bank is used, a select signal corresponding to a requestor is outputted in the order of higher priority. Respective request addresses for IP0, IP1 and IOP are selected by the selectors 46a to 46c and stored in the corresponding registers 33a to 33c in accordance with the select signals.

As appreciated from this embodiment, even if the same line requests are issued from three requestors IP0, IP1 and IOP at the same time, concurrent processing thereof is possible.

Figure 3:
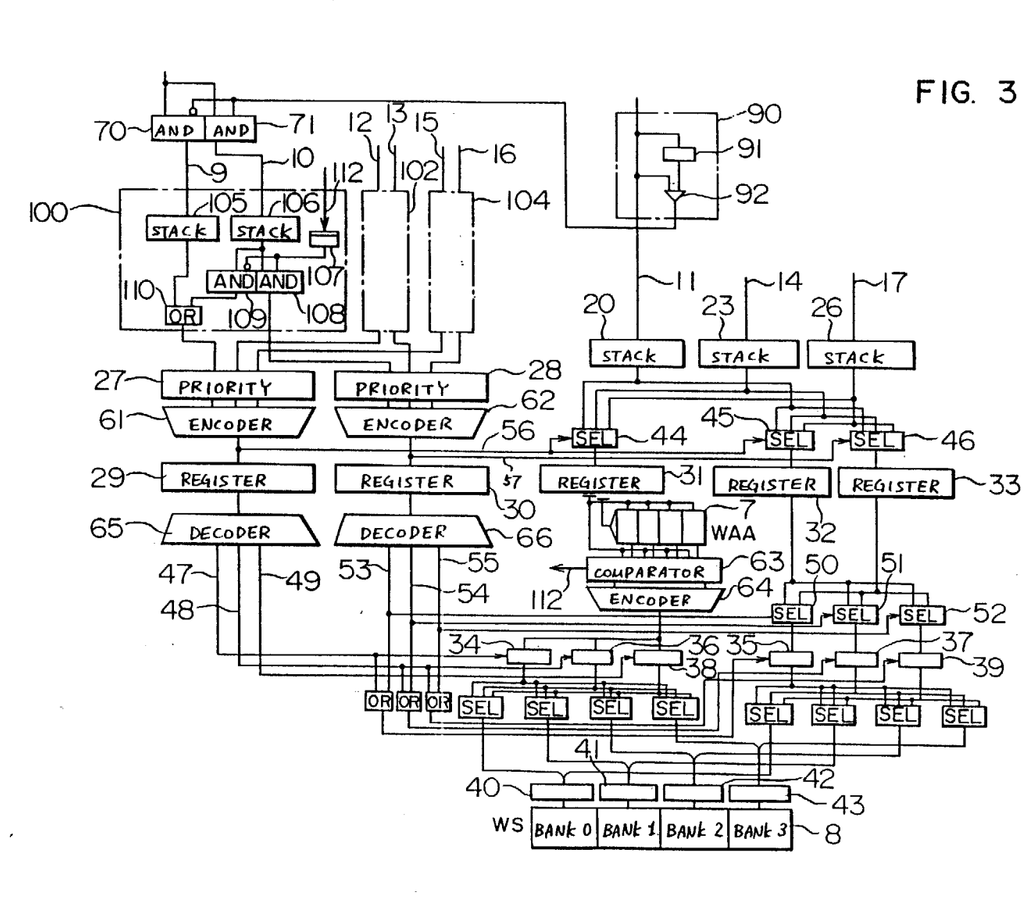
FIG. 3 is a schematic circuit diagram showing the main part of a second embodiment of the cache storage apparatus of this invention.
Figure 4:
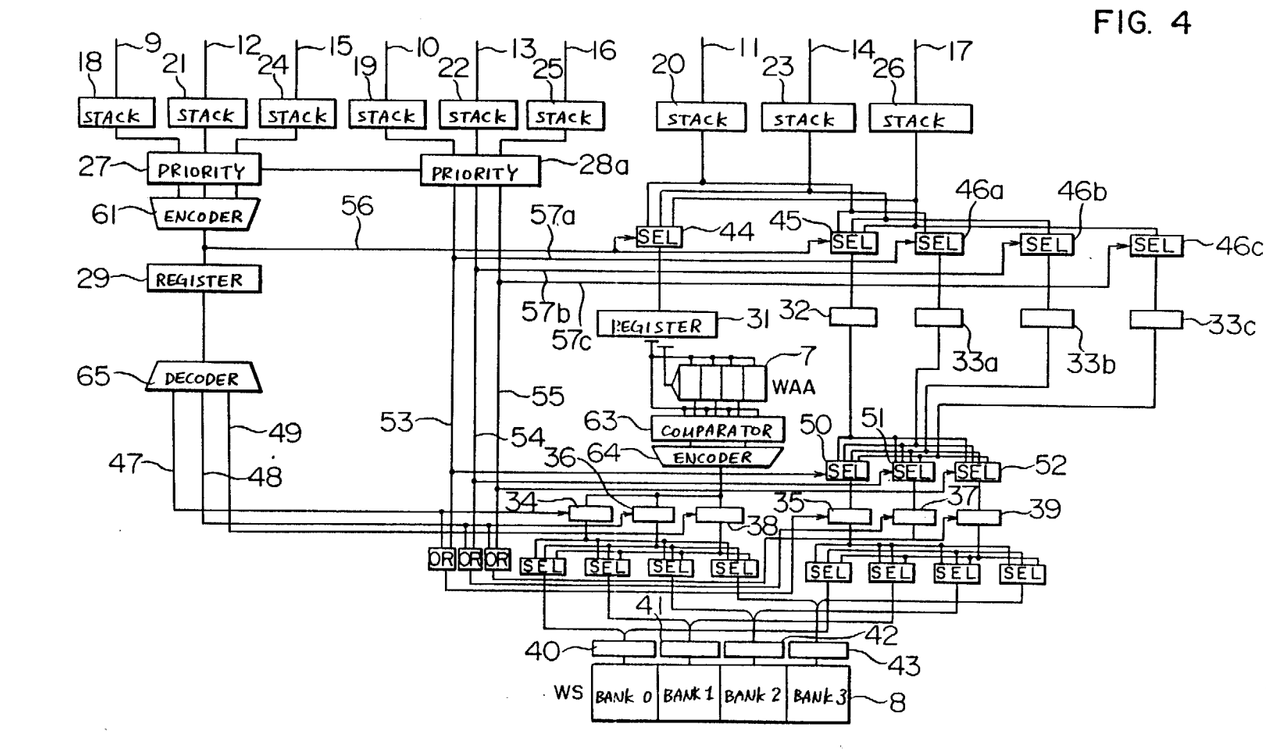
FIG. 4 is a schematic circuit diagram showing the main part of a third embodiment of the cache storage apparatus according to the present invention.

Obviously, the above embodiment is applicable to the second embodiment shown in FIG. 3.

In the above embodiments, the number of requestors has been set at three. However, the invention can be readily applied to four or more requestors.

According to the cache storage apparatus for processing requests by a plurality of requestors of this invention, if consecutive requests from the same requestor use the same access line, the succeeding request in the consecutive requests does not search the cache directory unit so that the cache directory unit can be freely used for access processing by other requestors. As a result, parallel processing of a plurality of requests is possible with a small increase in hardware quantity to thereby improve the utilization coefficient of the cache storage apparatus, reduce a wait time for each request, and improve throughput of the cache storage apparatus.

I claim:

1. A cache storage apparatus which copies and stores a part of data of a main storage and is accessed in accordance with an access request from a plurality of access requestors, said cache storage apparatus comprising:
   a cache storage means having a plurality of storage areas for copying and storing a part of data of said main storage in said plurality of storage areas, said stored data in a manner that each of said storage areas has each having a predetermined storage unit;
   a cache directory means for storing access information of data to be stored in said cache storage means;

judgement means for judging access requests from said plurality of access requestors such that in consecutive access requests from the same requestor, if a storage unit of a succeeding access request is the same as that of a preceding access request, said succeeding access request is judged as a same storage unit request, and if not, said succeeding request is judged as an ordinary request, and a first access request from each requestor is judged as said ordinary access request;

search means responsive to said ordinary access request judged by said judgement means for searching said cache directory means to read access information on said cache storage means; and stack means for storing said read-out access information for each requestor and accessing said cache storage means in accordance with said stored access information; wherein if an access request from a requestor is judged as said same storage unit access request by said judgement means, said search means does not search said cache directory means but actuates said stack means to read therefrom said access information of said preceding access request of said requestor, and said cache storage means is accessed in accordance with said read-out access information.

2. A cache storage apparatus according to claim 1, wherein if said ordinary access request and at least one said same storage unit access request are issued from different requestors and if said judgement means judges that said access requests use different storage areas of said cache storage means, then said ordinary access request is given to said search means to access said cache storage means, and said stack means is actuated in accordance with at least one said same storage unit access request.

3. A cache storage apparatus according to claim 2, wherein said judgement means includes priority order decision means for deciding the priority order of access requests from different requestors, and wherein if at least one said ordinary request and at least one said same storage unit access request are issued from different requestors and if said judgement means judges that said access requests use the same storage area of said cache storage means, said access requests are processed in the order of higher priority decided by said priority order decision means.

4. A cache storage apparatus according to claim 1 further comprising cache miss response means for responding to a cache miss resulted from the search of said cache directory means by said search means, wherein said cache miss response means responds to said cache miss and changes said same storage unit access request from a requestor to said ordinary access request which is then supplied to said search means.

* * * * *

UNITED STATES PATENT AND TRADEMARK OFFICE
CERTIFICATE OF CORRECTION

PATENT NO. : 4,916,604

DATED : April 10, 1990

INVENTOR(S) : Akio Yamamoto, et al.

It is certified that error appears in the above-identified patent and that said Letters Patent is hereby corrected as shown below:

Claim 1, column 8, line 63, after "data" insert --each having--.

Claim 1, column 8, line 64, delete "each having".

Signed and Sealed this

Fifteenth Day of September, 1992

Attest:

DOUGLAS B. COMER

*Attesting Officer*     *Acting Commissioner of Patents and Trademarks*